United States Patent
Chung (10) Patent No.: US 7,527,045 B2
(45) Date of Patent: May 5, 2009

(54) EVAPORATIVE EMISSION CONTROL SYSTEM AND METHOD FOR INTERNAL COMBUSTION ENGINE HAVING A MICROCONDENSER DEVICE

(75) Inventor: Dennis B. Chung, Dublin, OH (US)

(73) Assignee: Honda Motor Co., Ltd. (JP)

( * ) Notice: Subject to any disclaimer, the term of this patent is extended or adjusted under 35 U.S.C. 154(b) by 0 days.

(21) Appl. No.: 11/833,788

(22) Filed: Aug. 3, 2007

(65) Prior Publication Data

US 2009/0031996 A1    Feb. 5, 2009

(51) Int. Cl.
*F02M 33/02* (2006.01)

(52) U.S. Cl. ...................... 123/519; 123/520

(58) Field of Classification Search ............... 123/516, 123/518, 519, 522, 523, 524, 525, 540, 541
See application file for complete search history.

(56) References Cited

U.S. PATENT DOCUMENTS

| | | | |
|---|---|---|---|
| 2,963,013 A | 12/1960 | Fisher | |
| 3,942,499 A | 3/1976 | Kunik et al. | |
| 4,671,071 A | 6/1987 | Sasaki | |
| 4,732,588 A * | 3/1988 | Covert et al. | 96/144 |
| 4,829,968 A * | 5/1989 | Onufer | 123/518 |
| 4,869,225 A | 9/1989 | Nagata et al. | |
| 5,255,735 A | 10/1993 | Raghava | |
| 5,415,196 A * | 5/1995 | Bryant et al. | 137/14 |
| 5,787,865 A | 8/1998 | Harris et al. | |
| 5,910,637 A | 6/1999 | Meiller et al. | |
| 5,957,113 A | 9/1999 | Masaki et al. | |
| 5,964,204 A | 10/1999 | Freeland | |
| 5,989,321 A | 11/1999 | Senn | |
| 6,033,506 A | 3/2000 | Klett | |
| 6,037,032 A | 3/2000 | Klett et al. | |
| 6,189,516 B1 | 2/2001 | Hei Ma | |
| 6,360,729 B1 | 3/2002 | Ellsworth | |
| 6,430,935 B1 | 8/2002 | Klett et al. | |
| 6,438,964 B1 | 8/2002 | Giblin | |
| 6,474,312 B1 | 11/2002 | Zulauf et al. | |
| 6,526,950 B2 | 3/2003 | Ito | |
| 6,533,002 B1 | 3/2003 | Kobayashi | |
| 6,569,228 B2 | 5/2003 | Ito | |
| 6,729,269 B2 | 5/2004 | Ott et al. | |
| 6,772,740 B2 * | 8/2004 | Kojima et al. | 123/519 |
| 6,786,207 B2 * | 9/2004 | Kojima et al. | 123/516 |
| 6,868,808 B2 * | 3/2005 | Brunemann et al. | 123/3 |
| 6,948,322 B1 | 9/2005 | Giblin | |
| 7,261,092 B1 * | 8/2007 | Oku et al. | 123/516 |
| 2001/0052292 A1 * | 12/2001 | Ito | 96/134 |
| 2004/0128989 A1 | 7/2004 | Watanabe et al. | |

FOREIGN PATENT DOCUMENTS

| GB | 2 329 218 | 3/1999 |
|---|---|---|
| JP | 11-093784 | 4/1999 |

* cited by examiner

*Primary Examiner*—Thomas N Moulis
(74) *Attorney, Agent, or Firm*—Fay Sharpe LLP (57) ABSTRACT

A canisterless evaporative emission control system for an internal combustion engine includes a fuel tank for the internal combustion engine wherein vaporized fuel is generated and a microcondenser device for processing the vaporized fuel received from the fuel tank. An inlet passageway establishes fluid communication between the fuel tank and the microcondenser device for delivering the vaporized fuel from the fuel tank to the microcondenser device.

26 Claims, 4 Drawing Sheets

EVAPORATIVE EMISSION CONTROL SYSTEM AND METHOD FOR INTERNAL COMBUSTION ENGINE HAVING A MICROCONDENSER DEVICE

BACKGROUND

The present disclosure generally relates to a vehicle fuel system for an internal combustion engine, and more particularly to an evaporative emission control system and method for an internal combustion engine having a microcondenser device.

Conventional vehicle fuel systems associated with internal combustion engines typically employ a fuel canister for receiving fuel vapor from a vehicle's gas tank. The fuel canister is adapted to temporarily retain the received vapor therein to prevent it from being released to the atmosphere. More particularly, fuel vapor enters the fuel canister from the fuel tank wherein the fuel vapor is absorbed and retained in a carbon bed of the fuel canister. Typically the retention of the displaced fuel vapor within the canister is only temporary. More particularly, the fuel vapor retained in the fuel canister is periodically purged to allow the canister to accommodate and absorb additional fuel vapor from fuel tank. During such purging, the fuel vapor captured by the canister can be sent to the vehicle's engine, and particularly to an induction system of the engine.

Various other systems have also been proposed to more strictly control containment of fuel vapors and/or improve vehicle efficiently by controlling fuel vapor processing. For example, some systems include a bladder disposed in a vehicle's fuel tank that expands and contracts to control fuel vapor. A pump can be used in association with the bladder for applying pressure to walls of the bladder. The pressure is applied for purposes of forcing the bladder walls against the fuel contained therein to prevent or limit vapor formation. A fuel canister, as described in the preceding paragraph, can optionally be used in the bladder fuel system for capturing fuel vapor that forms despite the use of the bladder.

SUMMARY

According to one aspect, a canisterless evaporative emission control system for an internal combustion engine is provided. More particularly, in accordance with this aspect, the system includes a fuel tank for the internal combustion engine wherein vaporized fuel is generated, and a microcondenser device for processing the vaporized fuel received from the fuel tank. An inlet passageway establishes fluid communication between the fuel tank and the microcondenser device for delivering the vaporized fuel from the fuel tank to the microcondenser device.

According to another aspect, an evaporative emission control method for an internal combustion engine is provided. More particularly, in accordance with this aspect, fuel vapor from a fuel tank of a vehicle is directed to a mircocondenser device. The microcondenser device has a heat sink portion formed of carbon foam in thermal communication with a thermoelectric element for removing heat from the heat sink portion. The fuel vapor is processed by passing the fuel vapor through the heat sink portion to remove heat therefrom and condense at least a portion of the fuel vapor to liquid fuel. The liquid fuel is directed through a capillary transport line to at least one of the fuel tank, an induction system of the internal combustion engine, or a reservoir adapted for temporarily receiving the liquid fuel. The capillary transport line has a capillary transport material disposed therealong for effecting a capillary action to the liquid fuel to prevent back pressure from reaching the microcondenser through the capillary transport line.

According to yet another aspect, an evaporative emission control system for an internal combustion engine is provided. More particularly, in accordance with this aspect, an inlet passageway fluidly connects a vehicle fuel tank to a microcondenser device for passing rich fuel vapor from the fuel tank to the microcondenser device for processing thereby. The microcondenser device includes a heat sink portion which fluidly communicates with the inlet passageway to receive the rich fuel vapor and a thermoelectric portion which thermally communicates with the heat sink portion to remove heat therefrom and condense the rich fuel vapor. A first outlet passageway fluidly connects to the microcondenser device for directing a remaining dilute vapor portion of the rich fuel vapor to an induction system of the internal combustion engine. A second outlet passageway fluidly connects to the microcondenser for directing liquefied fuel which was condensed from the rich fuel vapor to the fuel tank.

DETAILED DESCRIPTION

Figure 1:
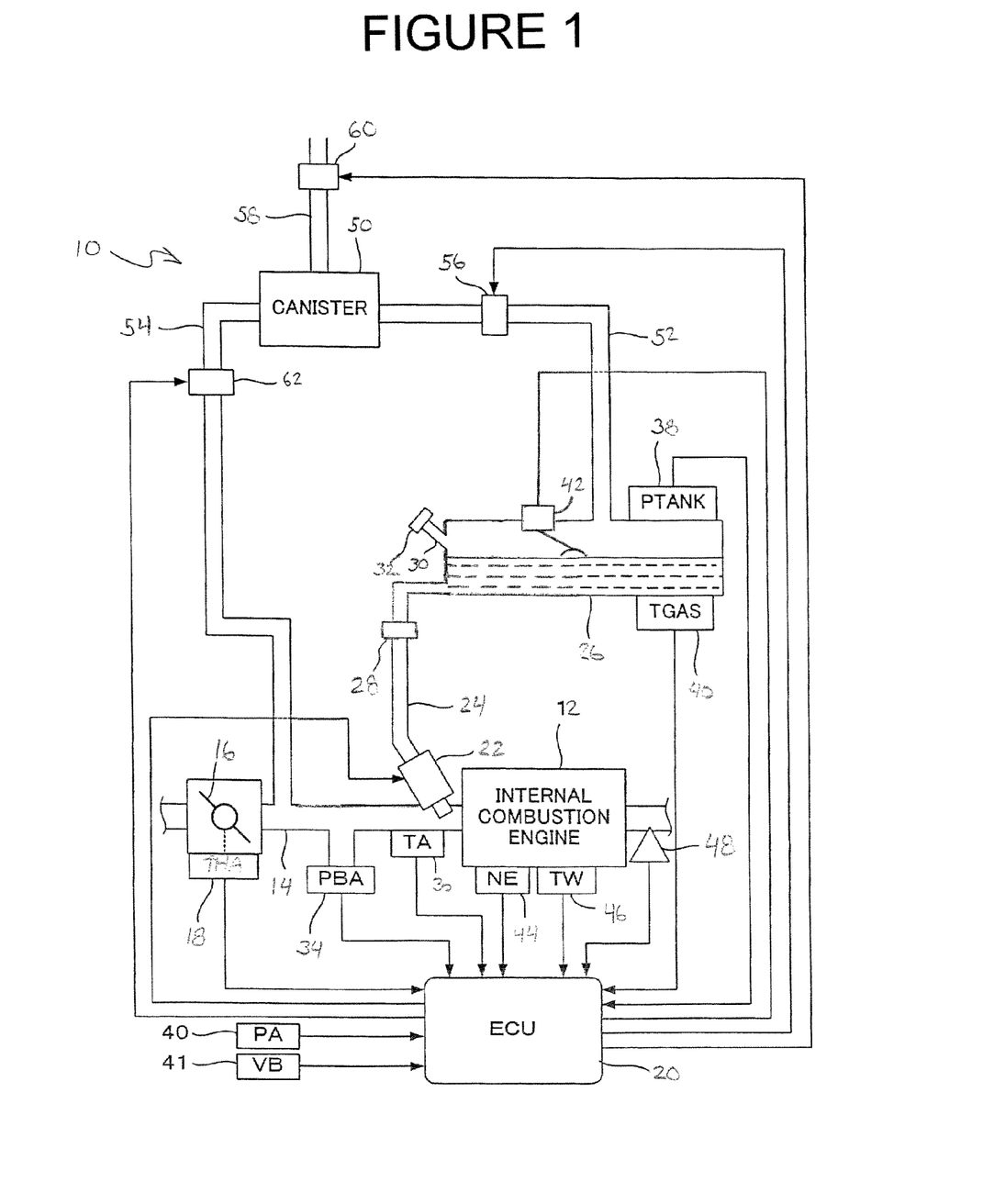
FIG. 1 is a schematic view of a prior art evaporative emission control system having a conventional canister and control valves therefor for processing fuel vapor.

Referring now to the drawings wherein the showings are for purposes of illustrating one or more exemplary embodiments, FIG. 1 schematically shows an evaporative emission control system 10 for an internal combustion engine 12. More particularly, in FIG. 1, the internal combustion engine 12 can have a plurality of cylinders (not shown), such as four for example. The engine 12 is provided with an induction system including an intake pipe 14, in which a throttle valve 16 is operatively mounted. A throttle valve opening (THA) sensor 18 is connected to the throttle valve 16. The throttle valve opening sensor 18 outputs a signal corresponding to the opening angle of the throttle valve 16 and supplies the signal to an electronic control unit (ECU) 20.

Fuel injection valves 22, only one of which is shown, are inserted into the intake pipe 14 at locations intermediate between the cylinder block of the engine 12 and the throttle valve 16 and slightly upstream of the respective intake valves (not shown). All the fuel injection valves 22 are connected through a fuel supply pipe 24 to a fuel tank 26 and fuel pump unit 28 is provided therealong for delivering fuel from the tank 26 to the fuel injection valves 22. Each fuel injection valve 22 is electrically connected to the ECU 20, and its valve opening period is controlled by a signal from the ECU 20. The fuel tank 26 to which the valves 22 are connected has a fuel inlet 30 for use in refueling and a filler cap 32 for selectively closing the fuel inlet.

One or more sensors can be provided on the intake pipe 14 for monitoring conditions at the intake pipe. For example, the intake pipe 14 can be provided with an intake pipe absolute pressure (PBA) sensor 34 for detecting an absolute pressure (PBA) in the intake pipe 14 and an intake air temperature TA sensor 36 for detecting an air temperature TA in the intake pipe 14 at positions downstream of the throttle valve 16. These sensors, including sensors 34,36, can each output a signal corresponding to a sensed condition (e.g., PBA or TA) and supply the outputted signal to the ECU 20. In addition, the fuel tank 26 can be provided with one or more sensors for monitoring specific conditions thereof, including, for example, a tank pressure (PTANK) sensor 38 for detecting a pressure (PTANK) in the fuel tank 26, a fuel temperature (TGAS) sensor 40 for detecting a fuel temperature (TGAS) in the fuel tank 26, and a fuel level sensor 42 for detecting a fuel level (i.e., a remaining fuel amount) in the fuel tank 26. Like the other sensors already described herein, the fuel tank sensors, including sensors 38,40,42, can each output a signal corresponding to a sensed condition at the fuel tank 26 and provide the signal to the ECU 20.

Additional sensors can be provided on or in association with the engine 12. More particularly, an engine rotational speed (NE) sensor 42 for detecting an engine rotational speed can be disposed near the outer periphery of a camshaft or a crankshaft (both not shown) of the engine 12. The engine rotational speed sensor 42 outputs a pulse (TDC signal pulse) at a predetermined crank angle per 180 degree rotation of the crankshaft of the engine 12. There can also be provided an engine coolant temperature sensor 44 for detecting a coolant temperature (TW) of the engine 12 and an oxygen concentration sensor (which will be hereinafter referred to as "LAF sensor") 46 for detecting an oxygen concentration in exhaust gases from the engine 12. Detection signals from these sensors 42 to 46 are supplied to the ECU 20. The LAF sensor 46 can function as a wide-area air-fuel ratio sensor adapted to output a signal substantially proportional to an oxygen concentration in exhaust gases (proportional to an air-fuel ratio of air-fuel mixture supplied to the engine 12).

There will now be described a configuration for preventing the emission of evaporative or vaporized fuel generated in the fuel tank 26 into the atmosphere, such as during refueling. As shown, the fuel tank 26 is connected to a canister 50 through a charge linear passageway 52. The canister 50 is connected through a purge passageway 54 to the intake pipe 14 at a location downstream of the throttle valve 16. The charging passageway 52 is provided with a charge control valve 56. The operation of the charge control valve 56, which can be a solenoid valve, is controlled by the ECU 20 such that the charge control valve 56 is selectively opened, such as during refueling, to introduce evaporative fuel from the fuel tank 26 to the canister 50, and is otherwise closed. The canister 50 can contain active carbon for adsorbing the evaporative fuel received from the fuel tank 26.

The canister 50 is adapted to communicate with atmosphere through a vent passageway 58. The vent passageway 58 is provided with a vent shut valve 60, which can be a solenoid valve. The vent shut valve 60 is a normally closed valve but is selectively operated and opened by the ECU 20, such as during refueling or during purging. The purging passageway 54 connected between the canister 50 and the intake passageway 14 is provided with a purge control valve 62, which can also be a solenoid valve controlled by the ECU 20. Through the purge valve 62, fuel vapor absorbed in the canister 50 can be appropriately purged to the intake pipe 14 of the engine 12 as is known and understood by those skilled in the art. For example, the on-off duty ratio of the purge valve 62 can be altered on the basis of control signals from the ECU 20 to continuously control the flow rate through the valve 62.

As will be known and understood by those skilled in the art, the ECU 20 can include an input circuit having various functions including, for example, a function of shaping the waveforms of input signals from the various sensors, a function of correcting the voltage levels of the input signals to a predetermined level, and a function of converting analog signal values into digital signal values. The ECU 20 can also include a central processing unit (CPU), a read-only memory (ROM) which stores various types of data and programs that are used to control various parts of the engine, a random-access memory (RAM) which provides a working region for operations by the CPU, and an output circuit for supplying drive signals to, for example, the fuel injection valves 22, the charge control valve 52, the vent shut valve 60 and the purge control valve 62. In controlling the fuel injection valves 22, the CPU of the ECU 20 can control the amount of fuel to be supplied to the engine 12 according to output signals from the various sensors including the engine rotational speed sensor 44, the intake pipe absolute pressure sensor 34, and the engine coolant temperature sensor 46.

The CPU of the ECU can control the canister related valves 52,60,62 so as to prevent or limit evaporative fuel generated in the tank 26, such as during refueling, from escaping to atmosphere. For example, during refueling of the tank 26, the charge control valve 56 and the vent shut valve 60 can be opened to cause evaporative fuel generated in the fuel tank 26 to move through the charge control valve 56 and into the canister 50. In the canister 50, the evaporative fuel from the tank 26 is separated into air, which is sent through the vent shut valve 60 and related to atmosphere, and fuel, which is trapped or captured in the canister 50. During normal operation of the engine 12, the charge control valve 56 is closed and the vent shut valve 60 is opened so as to purge the captured fuel from the canister 50. During purging, atmospheric air is supplied through the vent shut valve 60 to the canister 50 and the fuel previously absorbed by the canister 50 is purged through the purge control valve 62 into the intake pipe 14 where it is ultimately subjected to combustion within the engine 12.

Figure 2:
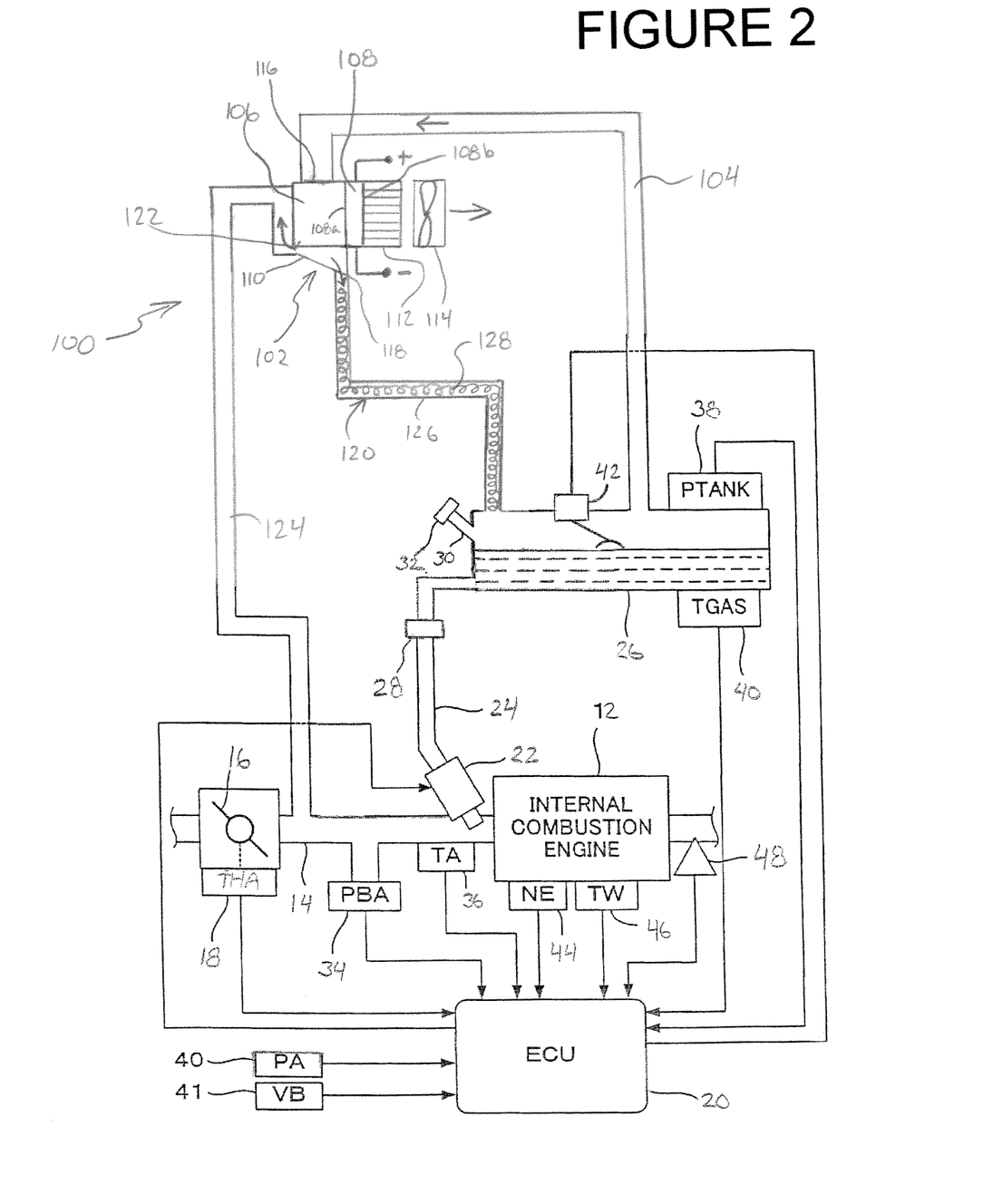
FIG. 2 is a schematic view of a evaporative emission control system having a microcondenser for processing fuel vapor and a capillary fuel transport line.

With reference now to FIG. 2, where like reference numerals are used to identify like components and new components are identified by new numerals, an improved evaporative emission control system for an internal combustion engine is generally identified by reference numeral 100. As will be described in further detail below, the illustrated evaporative emission control system 100, alternately referred to herein as a fuel or gas vapor containment system, generally employs or includes a microcondenser device 102 for receiving evaporative fuel or rich fuel vapor from the fuel tank 26, which is provided for fueling the engine 12, and returning condensed fuel to the fuel tank, and further for passing dilute or lean fuel vapor to the engine 12 via the intake pipe 14. In the illustrated embodiment, the microcondenser device 102 replaces the canister 50 of FIG. 1 and processes evaporative fuel that is displaced from the fuel tank 26 via natural convection through evaporative fuel inlet passageway or line 104, which establishes fluid communication between the fuel tank and the microcondenser device, without allowing or at least eliminating such evaporative fuel from escaping to atmosphere.

In the canisterless evaporative emission control system of the illustrated embodiment, the microcondenser device 102 includes a heat sink portion 106 to which the vaporized fuel is directed and a thermoelectric portion or element 108, which is in thermal communication with the heat sink portion to remove heat therefrom thereby cooling and condensing the received vaporized fuel. In one embodiment, the thermoelectric element 108 is a Peltier microelement that employs or uses the Peltier effect to condense evaporative or vaporized fuel received from the fuel tank 26 via the evaporative fuel inlet passageway 104. More particularly, evaporative fuel (i.e., rich fuel vapor) from the fuel tank 26 is directed to the heat sink portion 106 of the microcondenser device 102 for cooling thereof. When a voltage is applied across the Peltier microelement 108, it functions as a heat pump moving heat from a first side 108*a* toward a second, opposite side 108*b*. By placing the heat sink portion 106 in close proximity to the microelement first side 108*a*, such as in adjacent and/or abutting relation, heat can be drawn from the heat sink portion and transferred to the opposite microelement side 108*b*. When rich fuel vapor is passed to or through the heat sink portion 106, the moving of heat from the heat sink portion has the effect of cooling the rich fuel vapor, at least some of which condenses back to liquid fuel which can be sent to the engine 12, back to the fuel tank 26 and/or to a reservoir (not shown) adapted for receiving such liquefied fuel. The Peltier microelement 108 can be effective in the vehicle fuel system 100 while being of a small size and requiring minimum power consumption (e.g., 0.18-0.7 amps at 12 Volts) thereby not taxing the spatial layout of the vehicle or the electrical system of the vehicle.

While the heat sink portion 106 could be formed of fins, including microfins and/or fins formed of a high heat-conducting material such as aluminum, the microcondenser device 102 of the illustrated embodiment employs carbon foam as the heat sink (i.e., the heat sink portion is formed of carbon foam). The carbon foam heat sink 106 provides the advantages of higher thermal conductivity and greater surface area per unit volume than conventional heat sinks and/or heat sinks formed of aluminum fins. Moreover, the carbon foam heat sink 106 has greater heat transfer efficiency than conventional arrangements which results in the overall electric load needed to power the microcondenser 102 being considerably lower than would be necessary if the heat sink were formed of conventional fins. The carbon foam heat sink 106 of the illustrated embodiment, and likewise in any alternate embodiment wherein fins are used as the heat sink, can be disposed in a housing 110 of the microcondenser device 102, a housing which can be formed of a high heat-conducting material, such as aluminum. The carbon foam element 106 can be in direct abutting contact with the microelement first side 108*a* or can be in thermal contact with the first side 108*a* through the housing 110, or some other intermediate component(s), to advantageously and/or more efficiently move heat from the evaporative fuel passed through the carbon foam heat sink 106 to the microelement 108.

To facilitate the transfer of heat from the heat sink portion 106, the microcondenser device 102 can employ or include heat dissipation fins 112 disposed on the second side 108*b*. The fins 112 can function to dissipate heat received at the microelement second side 108*b* to atmosphere and keep the second side 108*b* relatively cool so that it can more efficiently receive further heat from the heat sink portion 106. The heat dissipation fins 112 can be conventional fins and can be formed of aluminum or any other suitable high heat dissipation material. Alternatively, the fins 112 can be replaced with a carbon foam element, similar to that employed as the heat sink portion 106 in the illustrated embodiment, that has a higher surface area per unit volume than conventional fins. The use of a carbon foam element would further and more effectively dissipate heat to atmosphere and increase the overall efficiency and cooling ability of the microcondenser device 102. In addition, a fan 114 can be employed in association with the microelement side 108*b* or the fins 112 (i.e., such as being disposed adjacent the second side 108*b*) to facilitate dissipation of heat to atmosphere.

As illustrated, the housing 110 can include an inlet port 116 for receiving rich vapor from the line 104 fluidly connected to the fuel tank 26. As already described, the rich fuel vapor entering the housing 110 is passed through the carbon foam heat sink 106 in which the fuel vapor is cooled. As a result of such cooling, some of the rich fuel vapor will condense or liquefy (i.e., returning the fuel vapor to liquid fuel) and the remainder will remain vaporized, but in a more diluted or lean state. The fuel vapor that is liquefied can exit the housing 110 through first outlet port 118 and be directed by a first outlet passageway 120. Through the port 118, the first outlet passageway 120 is in fluid communication with the microcondenser device 102 for delivering the condensed, liquefied fuel which results from processing of the vaporized fuel to a first desired location. Though in the illustrated embodiment the first desired location is the fuel tank 26, it is to be appreciated that the first desired location could also be the induction system (including intake pipe 14) of the engine 12, a reservoir (not shown) for temporarily receiving and storing the condensed fuel, or some other location. In the illustrated embodiment, the diluted or lean vapor can exit the housing 110 through second outlet port 122 and be directed by a second outlet passageway 124. Through the port 122, the second outlet passageway 124 is in fluid communication with the microcondenser device 102 for delivering residual diluted vapor (i.e., lean vapor) which is not condensed to liquid fuel to a second desired location, which can be different or the same as the first desired location. In the illustrated embodiment, the second desired location is the induction system (including intake pipe 14) of the engine 12. However, the second desired location could alternately be the fuel tank 26, a reservoir (not shown) for temporality receiving and storing the dilute vapor, or some other location.

In one embodiment, the return line 120 can be a capillary transport line for directing condensed fuel retrieved from the rich fuel vapor passed through the microcondenser 102 to the first desired location (i.e., back to the fuel tank 26 in FIG. 2) and preventing back pressure from reaching the microcondenser 102 through the line 120. As a capillary transport line, the return line can include a conduit housing 126 with or having a capillary material 128 disposed therein along at least a portion of the conduit housing's length. The capillary material can be, for example, a polypropylene foam or some other hydrophobic material which effects a capillary action on the condensed fuel received in the line 120 and directs the same to the fuel tank 26. While directing the liquefied fuel to the tank 26, the capillary material 128 prevents back pressure from reaching the microcondenser 102. Alternatively, the return line 120 can be a conventional line for directing condensate fuel recovered by the device 102 back to the fuel tank 26.

With continued reference to FIG. 2, an evaporative emission control method for the internal combustion engine 12 will now be described. More particularly, in operation, fuel vapor from the fuel tank 26 is directed to the microcondenser device 102. The fuel vapor received from the fuel tank 26 is processed by passing it through the heat sink portion 106 of the microcondenser 102 to remove heat therefrom and condense at least a portion of the fuel vapor to liquid fuel. The liquid fuel is directed through the capillary transport line 120 to the fuel tank 26. As described above, however, the line 120 could alternatively be directed to the induction system (including the intake pipe 14), a reservoir, or some other location. By passing the liquid fuel through the capillary transport line 120, the capillary transport material 128 effects a capillary action to the liquid fuel which prevents back pressure from reaching the microcondenser 102 through the capillary transport line 120. The remaining dilute vapor portion (i.e., the portion of the fuel vapor from the fuel tank 26 that is not condensed to liquid fuel during processing of the fuel vapor) is separately directed to the intake pipe 14. As already described, the dilute vapor portion could alternatively be directed to the fuel tank 26, a reservoir, or some other location.

Several advantages relating to the system 100 and its employment of the microcondenser device 102 will become apparent to those skilled in the art upon reading the present disclosure, particularly in comparison to prior art fuel systems having canister arrangements. For example, in addition to eliminating the need for a conventional canister, the microcondenser 102 eliminates the need for the purging system (which includes the valves 56,60,62 in FIG. 1) associated with the canister. This has the advantage of simplifying the evaporative emission control system (i.e., purging system valves are not needed and thus control of such valves by the ECU is no longer required). In addition, the evaporative emission control system 100 and its microcondenser 102 advantageously occupy much less space when installed in a vehicle (i.e., the microcondenser device 102 is significantly smaller than a conventional canister and the canister's purging system valves can be eliminated entirely). In particular, a conventional canister, such as canister 50 in FIG. 1, typically has a volume of about two (2) liters, which is significantly larger than the volume of the microcondenser device 102 (which can be about 1-2 milliliters). Thus, the compact size of the microcondenser device 102 is advantageous and directly related to its use in a vehicle application, where size and weight are almost always important design considerations. Other advantages relate specifically to the use of the microcondenser device 102 in the system 100, including the lack of moving parts in the device 102 which enables the device to be less susceptible to vibrations, require less maintenance and be more reliable, all desirable attributes for a vehicle component.

Figure 3:
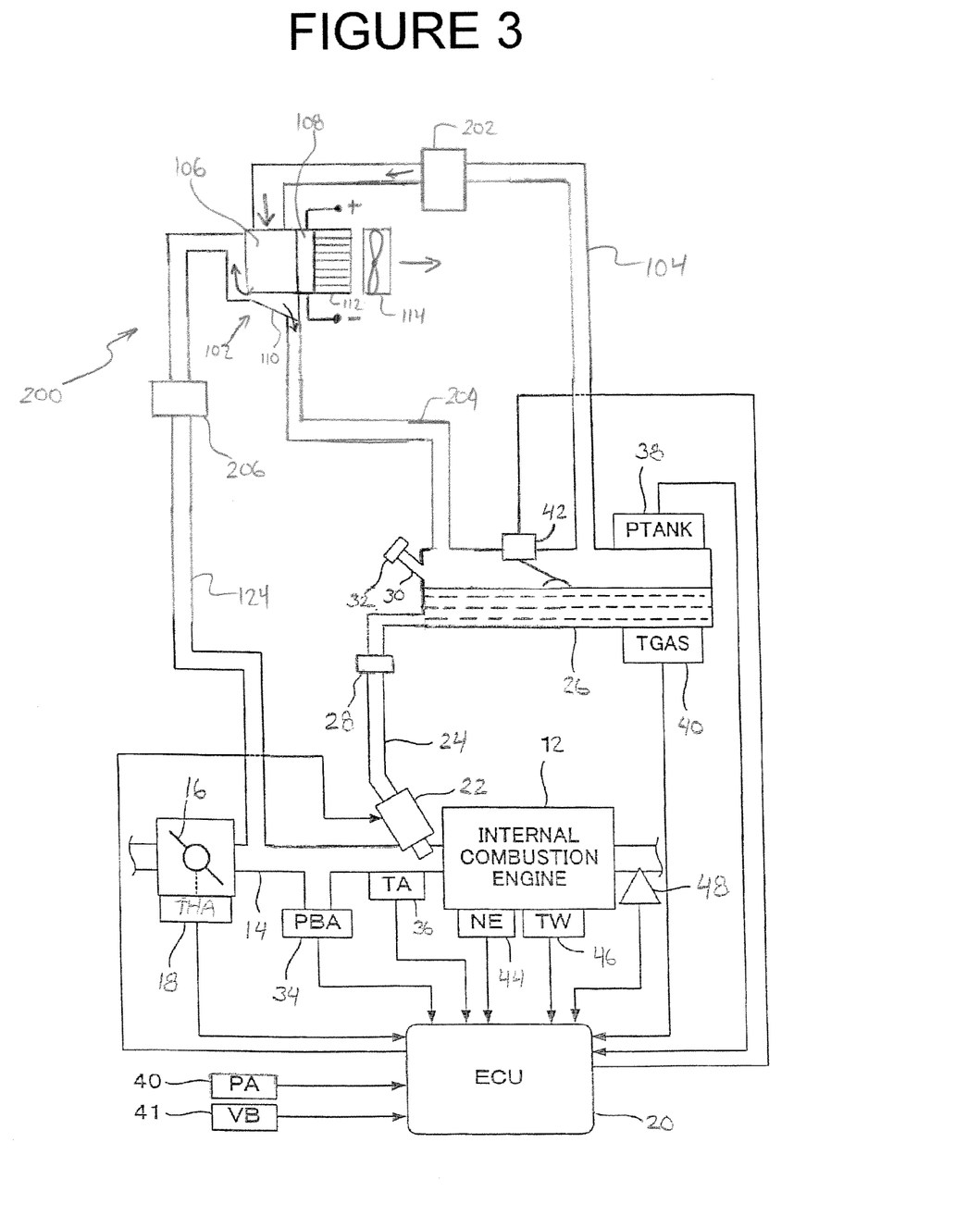
FIG. 3 is a schematic view of an evaporative emission control system having a microcondenser for processing fuel vapor, a pump for delivering fuel vapor to the microcondenser, and a fan for directing diluted fuel vapor from the microcondenser.

Turning now to FIG. 3, where again like reference numerals are used to identify like components and new components are identified by new reference numerals, another improved evaporative control system for an internal combustion engine is shown and generally indicated by reference numeral 200. In the system 200, a pump 202 is disposed along or in association with the inlet line 104 for forced convection into the microcondenser 102. Again, microcondenser device 102 can be used to process fuel vapor, in this case fuel vapor forced thereto by the pump 202 along input line 104, such that liquid fuel recovered from the rich vapor can be sent to the fuel tank 26 via return line or passageway 204 and separated from dilute vapor, which can be sent to the engine via line or passageway 124. In FIG. 3, return line 204 is depicted as a conventional line; however, it is to be appreciated by those skilled in the art that the return line could alternatively be a capillary transport line, such as line 120 of FIG. 2. In addition, a low energy fan 206 can be disposed along or in association with the line 124 for facilitating the movement of diluted vapor retrieved from the rich fuel vapor passed through the microcondenser device 102 in a direction toward the engine 12.

Though line 124 is shown in FIGS. 2-3 as directing diluted vapor from the microcondenser device 102 to the engine's intake pipe 14, other arrangements are contemplated and should be considered as being within the scope of the present disclosure. For example, line 124 could direct dilute vapor from the microcondenser device 102 back to the fuel tank 26 or to some other location. Similarly, though lines 104 and 204 are illustrated as directing condensed fuel from the microcondenser device 102 back to the fuel tank, other arrangements are contemplated and should be considered within the scope of the present disclosure. For example, either of lines 104 or 204 could direct condensed fuel to the engine 12 for use thereby or to some other location (e.g., a separately disposed reservoir). In addition, lines 104 and 204 need not attach to the ceiling of the fuel tank 26 but could connect anywhere to the fuel tank, such as on an underside of the fuel tank where a residual amount of liquid fuel is expected to remain. Still further, the lines for passing dilute vapor and condensed fuel from the microcondenser device 102 need not go to separate locations (such as line 204 extending to the tank 26 and line 124 extending to the intake pipe 14). Instead, optionally, both lines from the microcondenser device 102 could go to a common location (e.g., the fuel tank 26 or the engine 12).

Figure 4:
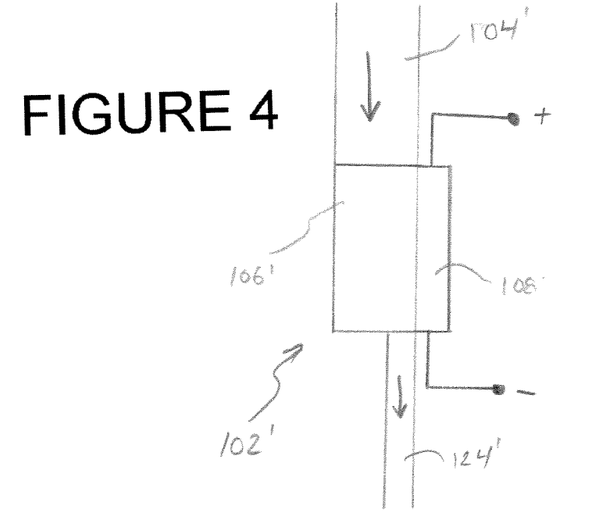
FIG. 4 is a schematic view of an alternate fuel vapor microcondenser for processing fuel vapor in an evaporative emission control system.

FIG. 4 illustrates an alternate microcondenser device 102' that, unlike the microcondenser device 102, does not separate rich vapor received from a fuel tank into liquid condensate for sending to a first location, such as back to the fuel tank, from dilute vapor for sending to a second location, such an intake manifold or pipe. Rather, the device 102' receives rich vapor from the fuel tank through an input line or conduit 104', processes the received rich fuel vapor and directs the processed vapor through an output line 124'. Except as indicated otherwise herein, the device 102' can be the same or similar to the device 102 of FIG. 2. For example, though not illustrated, the device 102' can be used with heat dissipation fins and/or a powered fan for removing heat from its microcondenser 108' and more efficiently cooling heat sink element 106', which can be formed of carbon foam. The microcondenser device 102' can receive rich fuel vapor from a fuel tank via natural connection (like device 102 in FIG. 2) or could be employed in the arrangement depicted in FIG. 3. Also, the vapor processed by the microcondenser 102' can be directed by the output line 124' to any one of the fuel tank from which the rich vapors were received, the engine (e.g., through the intake manifold or pipe) and/or a separate reservoir (not shown).

Figure 5:
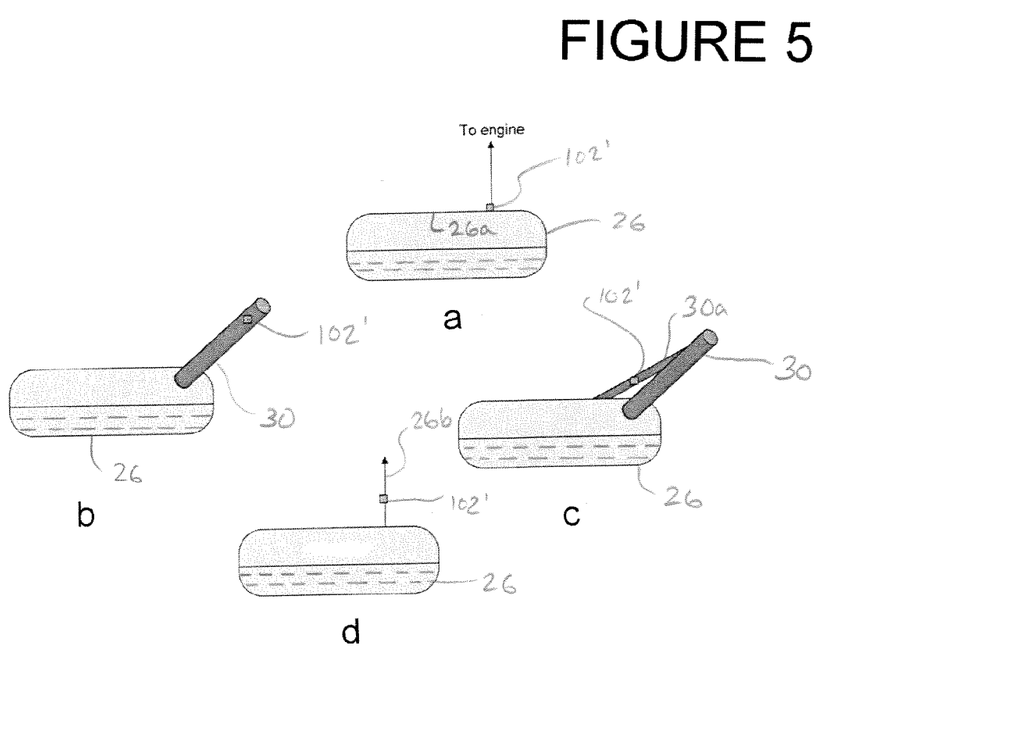
FIGS. 5a-d are schematic views showing the fuel vapor microcondenser of FIG. 5 located in any one of several locations on a vehicle fuel system.

With additional reference to FIGS. 5*a*-*d*, the microcondenser device 102' is shown as being deployed in several varying locations on a vehicle and in connection with the vehicle's fuel system. More particularly, microcondenser device 102' is shown in FIG. 6*a* on a ceiling surface 26*a* of the fuel tank 26 for processing fuel vapors generated in the fuel tank and sending the processed vapors to the vehicle's engine. FIG. 5*b* shows microcondenser device 102' disposed on fuel inlet or filler pipe 30. FIG. 5*c* shows microcondenser device 102' disposed on a fuel vapor return line 30*a* that is associated with fuel inlet or filler pipe 30. FIG. 5*d* shows microcondenser device 102' disposed on a vapor line 26*b* that is connected to and fluidly communicating with the fuel tank 26 and fluidly connects the fuel tank to the vehicle's engine. Though not illustrated, it is also contemplated that the microcondenser device 102' could be used in more than a single location (e.g., on a fuel filler pipe and on a line connecting the fuel tank to the vehicle's engine or intake manifold. In addition, it is also contemplated that the microcondenser 102' of FIGS. 5*a*-*d* could be replaced with the microcondenser 102 having a condensed fuel outlet passageway and a dilute vapor outlet passageway (see FIG. 2, for example).

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An evaporative emission control system for an internal combustion engine, said system comprising:
   a fuel tank for the internal combustion engine wherein vaporized fuel is generated;
   a microcondenser device for processing said vaporized fuel received from said fuel tank, said microcondenser device having a carbon foam portion that facilitates removal of heat from said vaporized fuel; and
   an inlet passageway establishing fluid communication between said fuel tank and said microcondenser device for delivering said vaporized fuel from said fuel tank to said microcondenser device.

2. The evaporative emission control system of claim 1 wherein said microcondenser device includes:
   a heat sink portion to which said vaporized fuel is directed; and
   a thermoelectric portion which removes heat from said heat sink portion thereby cooling and condensing said vaporized fuel, wherein at least one of said heat sink portion includes a carbon foam element in contact with said vaporized fuel and said thermoelectric portion includes a carbon foam element for dissipating heat to atmosphere.

3. The evaporative emission control system of claim 2 wherein said thermoelectric element is a Peltier microelement that uses the Peltier effect to condense said vaporized fuel received from said fuel tank through said inlet passageway.

4. An evaporative emission control system for an internal combustion engine, the system comprising:
   a fuel tank for the internal combustion engine wherein vaporized fuel is generated;
   a microcondenser device for processing said vaporized fuel received from said fuel tape, said microcondenser device including a heat sink portion formed of carbon foam to which said vaporized fuel is directed and a thermal electric portion which removes heat from said heat sink portion thereby cooling and condensing said vaporized fuel; and
   an inlet passageway establishing fluid communication between said fuel tank and said microcondenser device for delivering said vaporized fuel from said fuel tank to said microcondenser device.

5. The evaporative emission control system of claim 2 wherein said heat sink portion is formed of a plurality of aluminum microfins.

6. The evaporative emission control system of claim 2 wherein said microcondenser device further includes heat dissipation fins disposed on a second side of said thermoelectric portion that is opposite a first side adjacent said heat sink portion for dissipating heat on said second side to atmosphere.

7. An evaporative emission control system for an internal combustion engine, the system comprising:
   a fuel tank for the internal combustion engine wherein vaporized fuel is generated;
   a microcondenser device for processing said vaporized fuel received from said fuel tank, said microcondenser device including a heat sink portion to which said vaporized fuel is directed and thermoelectric portion which removes heat from said heat sink portion thereby cooling and condensing said vaporized fuel, wherein said microcondenser device further includes a carbon foam element disposed on a second side of said thermoelectric portion that is opposite a first side adjacent said heat sink portion for dissipating heat on said second side to atmosphere; and
   an inlet passageway establishing fluid communication between said fuel tank and said microcondenser device for delivering said vaporized fuel from said fuel tank to said microcondenser device.

8. The evaporative emission control system of claim 2 further including a fan disposed adjacent a second side of said thermoelectric portion opposite a first side adjacent said heat sink portion for dissipating heat on said second side to atmosphere.

9. The evaporative emission control system of claim 1 further including an outlet passageway in fluid communication with said microcondenser device for delivering condensed fuel which results from processing of said vaporized fuel to a first desired location.

10. The evaporative emission control system of claim 9 wherein said outlet passageway delivers said condensed fuel to at least one of said fuel tank, an induction system of the internal combustion engine, or a reservoir adapted for temporarily storing said condensed fuel.

11. An evaporative emission control system for an internal combustion engine, the system comprising:
    a fuel tank for the internal combustion engine wherein vaporized fuel is generated;
    a microcondenser device for processing said vaporized fuel received from said fuel tank;
    an inlet passageway establishing fluid communication between said fuel tank and said microcondenser device for delivering said vaporized fuel from said fuel tank to said microcondenser device; and
    an outlet passageway in fluid communication with said microcondenser device for delivering condensed fuel which results from processing of said vaporized fuel to a first desired location, wherein said outlet passageway is a capillary transport line that directs said condensed fuel to said desired location while preventing back pressure from reaching said microcondenser device through said outlet passageway.

12. The canisterless evaporative emission control system of claim 11 wherein said capillary transport line includes a conduit housing having a capillary transport material disposed therein along at least a portion of a length of said capillary transport line for effecting a capillary action on said condensed fuel received therein.

13. The canisterless evaporative emission control system of claim 12 wherein said capillary transport material is polypropylene foam.

14. The canisterless evaporative emission control system of claim 9 further including a second outlet passageway in fluid communication with said microcondenser device for delivering residual dilute vapor which is not condensed to liquid fuel to a second desired location, said second desired location optionally being the same as said first desired location.

15. The canisterless evaporative emission control system of claim 14 wherein said second outlet passageway delivers said dilute vapor to at least one of said fuel tank, an induction system of the internal combustion engine, or a reservoir adapted for temporarily receiving said dilute vapor.

16. The canisterless evaporative emission control system of claim 15 wherein said outlet passageway delivers said condensed fuel, which is liquefied, back to said fuel tank and said second outlet passageway delivers said dilute vapor to said induction system.

17. The canisterless evaporative emission control system of 16 wherein said outlet passageway that delivers said condensed fuel is a capillary transport line having a capillary transport material disposed therealong for effecting a capillary action on said condensed, liquefied fuel being directed to said fuel tank while preventing back pressure from reaching said microcondenser device through said outlet passageway.

18. The canisterless evaporative emission control system of claim 14 further including a low energy fan disposed along said second outlet passageway for facilitating movement of said diluted vapor to said second desired location.

19. The canisterless evaporative emission control system of claim 1 further including a pump disposed along said inlet passageway for directing said vaporized fuel from said fuel tank to said microcondenser device by forced convection.

20. The canisterless evaporative emission control system of claim 1 wherein said inlet passageway is one of a fuel filler pipe provided for refilling said fuel tank or a fuel vapor return line extending between said fuel tank and said fuel filler pipe at a location spaced from said fuel tank.

21. The canisterless evaporative emission control system of claim 1 wherein said microcondenser device is disposed on a ceiling surface of said fuel tank.

22. An evaporative emission control method for an internal combustion engine, comprising:
    directing fuel vapor from a fuel tank of a vehicle to a microcondenser device, said microcondenser device having a heat sink portion formed of carbon foam in thermal communication with a thermoelectric element for removing heat from said heat sink portion;
    processing said fuel vapor by passing said fuel vapor through said heat sink portion to remove heat therefrom and condense at least a portion of said fuel vapor to liquid fuel; and
    directing said liquid fuel through a capillary transport line to at least one of said fuel tank, an induction system of the internal combustion engine, or a reservoir adapted for temporarily storing said liquid fuel, said capillary transport line having a capillary transport material disposed therealong for effecting a capillary action to said liquid fuel to prevent back pressure from reaching said microcondenser through said capillary transport line.

23. The evaporative emission control method of claim 22 further including:
    separately directing a remaining dilute vapor portion of said fuel vapor that is not condensed to liquid fuel during processing of said fuel vapor to at least one of said fuel tank, said induction system or said reservoir.

24. An evaporative emission control system for an internal combustion engine, comprising:
    an inlet passageway fluidly connecting a vehicle fuel tank directly to a microcondenser device without a canister for passing rich fuel vapor from said fuel tank to said microcondenser device for processing thereby;
    said microcondenser device including a heat sink portion which fluidly communicates with said inlet passageway to receive said rich fuel vapor and a thermoelectric portion which thermally communicates with said heat sink portion to remove heat therefrom and condense said rich fuel vapor;
    a first outlet passageway fluidly connected to said microcondenser for directing a remaining dilute vapor portion of said rich fuel vapor to an induction system of the internal combustion engine; and
    a second outlet passageway fluidly connected to said microcondenser for directing liquefied fuel which was condensed from said rich fuel vapor to said fuel tank.

25. The evaporative emission control system of claim 24 wherein said heat sink portion includes a carbon foam element for efficiently moving heat from said rich fuel vapor to said thermoelectric portion and said second outlet passageway is a capillary transport line having a capillary transport material disposed therealong for effecting a capillary action to said liquefied fuel to prevent back pressure from reaching said microcondenser through said capillary transport line.

26. The evaporative emission control system of claim 25 wherein said microcondenser device further includes a housing in which said heat sink portion is disposed, said housing having an inlet port fluidly connected to said inlet passageway, a first outlet port fluidly connected to said first passageway and a second outlet port fluidly connected to said second passageway.

* * * * *